United States Patent [19]

Frost, Jr. et al.

[11] 4,309,944

[45] Jan. 12, 1982

[54] HIGH SPEED FRUIT FEEDING APPARATUS

[75] Inventors: Elmer F. Frost, Jr.; Gregory J. Larsen, both of Lakeland, Fla.

[73] Assignee: FMC Corporation, Chicago, Ill.

[21] Appl. No.: 120,965

[22] Filed: Feb. 13, 1980

[51] Int. Cl.³ .............................................. B30B 9/06
[52] U.S. Cl. .................................. 100/104; 100/108; 100/213; 100/215; 99/509; 198/570; 198/733
[58] Field of Search ................... 100/213, 37, 39, 108, 100/105, 104, 215; 99/495, 496, 509, 510; 198/733, 728, 729, 449, 841, 459, 408, 786, 533, 570

[56] References Cited

U.S. PATENT DOCUMENTS

| | | | |
|---|---|---|---|
| Re. 26,357 | 3/1968 | Griner et al. | 198/459 X |
| Re. 26,375 | 4/1968 | McLearn | 198/733 X |
| 2,326,165 | 8/1943 | Pelosi | 198/733 |
| 2,649,730 | 8/1953 | Hait . | |
| 2,765,897 | 10/1956 | Vamvakas et al. | 198/408 |
| 2,780,988 | 2/1957 | Belk et al. . | |
| 3,030,878 | 4/1962 | Holzer | 100/237 |
| 3,040,864 | 6/1962 | Belk | 198/478 |
| 3,370,689 | 2/1968 | Winden | 198/408 |
| 3,500,982 | 3/1970 | Belk . | |

FOREIGN PATENT DOCUMENTS

| | | | |
|---|---|---|---|
| 665939 | 10/1965 | Belgium | 198/408 |
| 521219 | 10/1976 | U.S.S.R. | 198/408 |

*Primary Examiner*—Peter Feldman
*Attorney, Agent, or Firm*—Louis J. Pizzanelli; Richard B. Megley

[57] ABSTRACT

A sequential feeder for rapidly feeding fruit to a sequential citrus fruit extractor includes a plurality of chain conveyors, each conveyor being mounted in a vertical plane extending between a lane of a fruit hopper and a lower extractor cup of the extractor. Each chain conveyor includes a plurality of fingers mounted in uniform intervals thereon. A guide plate assembly is provided for each chain for having a contour which causes the chain to move upwardly from the fruit support through a broad curvature adapted to assure that the fingers maintain positive control of the fruit. The guide plate assembly has a sharply curved upper end which causes the fingers of the chain conveyor to pivot rapidly forward after a fruit has been elevated to a height above the associated lower extractor cup such rapid pivoting causes the fruit to be propelled at a high speed into the associated cup. An arched bridge is provided above each conveyor for slidably guiding a fruit as it is elevated from the fruit support to said height above the lower cup and for thereafter guiding the fruit as it is propelled toward the lower cup.

11 Claims, 6 Drawing Figures

FIG_1

FIG_2

FIG_4

FIG_5

FIG_6

HIGH SPEED FRUIT FEEDING APPARATUS

BACKGROUND OF THE INVENTION

1. Field of the Invention

The present invention generally relates to apparatus for feeding articles, and more particularly, the present invention relates to apparatus for successively feeding fruit at high rates.

2. Description of the Prior Art

Juice extractors of the interdigitating cup type disclosed in the U.S. Pat. Nos. 2,780,988 to W. C. Belk et al and 2,649,730 to J. M. Hait have been used for many years to extract juice from citrus fruit. Over the years, this type of extractor has been operated at increasingly higher rates of speed and is now run at a speed of about 100 fruit per extractor cup per minute. To feed fruit to the extractor cups at such high rates, a feeding apparatus as shown and described in the U.S. Pat. No. 3,040,864 to W. C. Belk was developed.

The fruit feeding apparatus of U.S. Pat. No. 3,040,864 is designed to concurrently feed several fruit at several transversely spaced pick-up stations to the stationary lower cups of the extractor. The feeding apparatus includes a reel which is rotated synchronously with the movement of the upper cups of the extractor with finger units being attached to the reel in alignment with each pick-up station and with each finger unit having a cam follower projecting therefrom. A central camshaft having stationary cam discs thereon is provided to pivot the cam followers of the finger units. The cam discs are contoured to cause the finger units to initially engage a fruit and to thereafter elevate the fruit so that the finger unit moves at a relatively slow speed corresponding to the speed of rotation of the reel. The cam discs are further designed to cause the fingers to pivot rapidly forward after the fruit has been raised to a height where it may be thrown into the adjacent extractor cup to thereby rapidly accelerate the fruit and eject it into the cup at a high velocity. This prior art feeding apparatus receives fruit from a vibratory hopper and further includes several arched bridges that extend from fruit supports at the pick-up stations adjacent the lower end of the fruit hopper to near the lower cups of the extractor. The several finger units are each attached to the reel to straddle a bridge so as to propel or slide the fruit along the bridge to the upper end of the bridge and thereafter to rapidly propel the fruit over a horizontal downstream section of the bridge into the associated lower extractor cup.

A new extractor has been designed to operate at a much higher speed than the aforementioned extractor. Such new extractor also includes several pairs of interdigitating cups, but the upper extractor cups are operated sequentially rather than concurrently. This new sequential extractor is described in a copending concurrently filed U.S. patent application, Ser. No. 120,966, filed Feb. 13, 1980, of Gregory J. Larsen et al entitled Citrus Fruit Extractor. The sequential citrus fruit juice extractor described and claimed in such copending application is capable of operating at a speed in excess of 150 fruit per cup per minute. At such a high speed, the cups of the extractor are only open to receive fruit for a very short time period. It will be understood that a feeder must be provided to feed fruit to such new extractor which feeder is capable of ejecting the fruit at sufficiently high velocities so they may be fed into the cups of the extractor during such short time period.

The high speed feed mechanism of U.S. Pat. No. 3,040,864 has been heretofore used only in connection with the prior art interdigitating cup extractors wherein all of the upper cups are simultaneously raised or lowered. If this type of rotary feeder were to be modified for sequential operation, a separate arrangement of a reel, several finger units and cam discs would be needed at each and every fruit feeding station. Thus, the modified feeder would be very complex and expensive to manufacture, and there would not be sufficient space between the individual feed reels to permit the discharge of fruit that failed to be picked up by the feeder.

SUMMARY OF THE INVENTION

The present invention provides a new concept in the field of feeding rounded objects, particularly citrus fruit, which is capable of feeding fruit, or other rounded objects, at high speeds. The feeding apparatus of the present invention can, for example, feed fruit to the several cups of an interdigitating cup type juice extractor at rates of 150 fruit per cup per minute and higher. The fruit feeding apparatus of the present invention preferably comprises several fruit feeder mechanisms connected to a common drive shaft in alignment with the areas (such as the lower cups of a fruit juice extractor) to which fruit are to be fed. Each feeder mechanism of the present invention includes an endless chain having fruit propelling fingers rigidly attached thereto at uniform intervals thereon and a chain guide structure which supports the chain for upward movement in a vertical plane through a preselected curvilinear path that ends in a downwardly curved portion adapted to cause the fingers to pivot rapidly forward to eject fruit at high velocities toward the extractor cup.

In the preferred embodiment, the chain guide structure is shaped so that the portion of the path of travel of the chain which is upstream of the aforementioned downwardly curved portion is upwardly curved along a curved path of decreasing radius to cause the fingers to tilt forward quite gradually as they are elevated from a fruit pick-up station. Also, in the preferred embodiment, fruit are moved across arched bridges having contours which correspond to the contour of the associated chain guide structure and which include end portions that extend horizontally toward the cups.

To provide for sequential feeding of fruit from the respective fruit pick-up stations to the associated extractor cups of a sequential fruit juice extractor, for example, the chains of the several fruit feeder mechanisms are operatively connected to the common drive shaft so that the propelling fingers of the respective chains move in timed relationship with respect to each other with each chain being separately synchronized with the sequential movement of the associated extractor cup. In this embodiment, each chain guide structure is preferably comprised of a thin contoured plate assembly that is vertically mounted so that substantial spacing is provided between the respective fruit feeder mechanisms, thereby enabling fruit to fall therebetween.

It will be appreciated that the present invention contemplates a relatively simple, rugged fruit feeding apparatus that is capable of feeding fruit at very rapid rates to a sequentially operated cup type of extractor in a precisely timed relationship with the sequential movement of the cups of the extractor. Also, the present invention provides a fruit feed mechanism which will first elevate a fruit and thereafter rapidly accelerate the fruit to a high velocity without loosing control of the fruit even though such fruit may vary widely in size and shape.

DESCRIPTION OF THE PREFERRED EMBODIMENT

Figure 1:
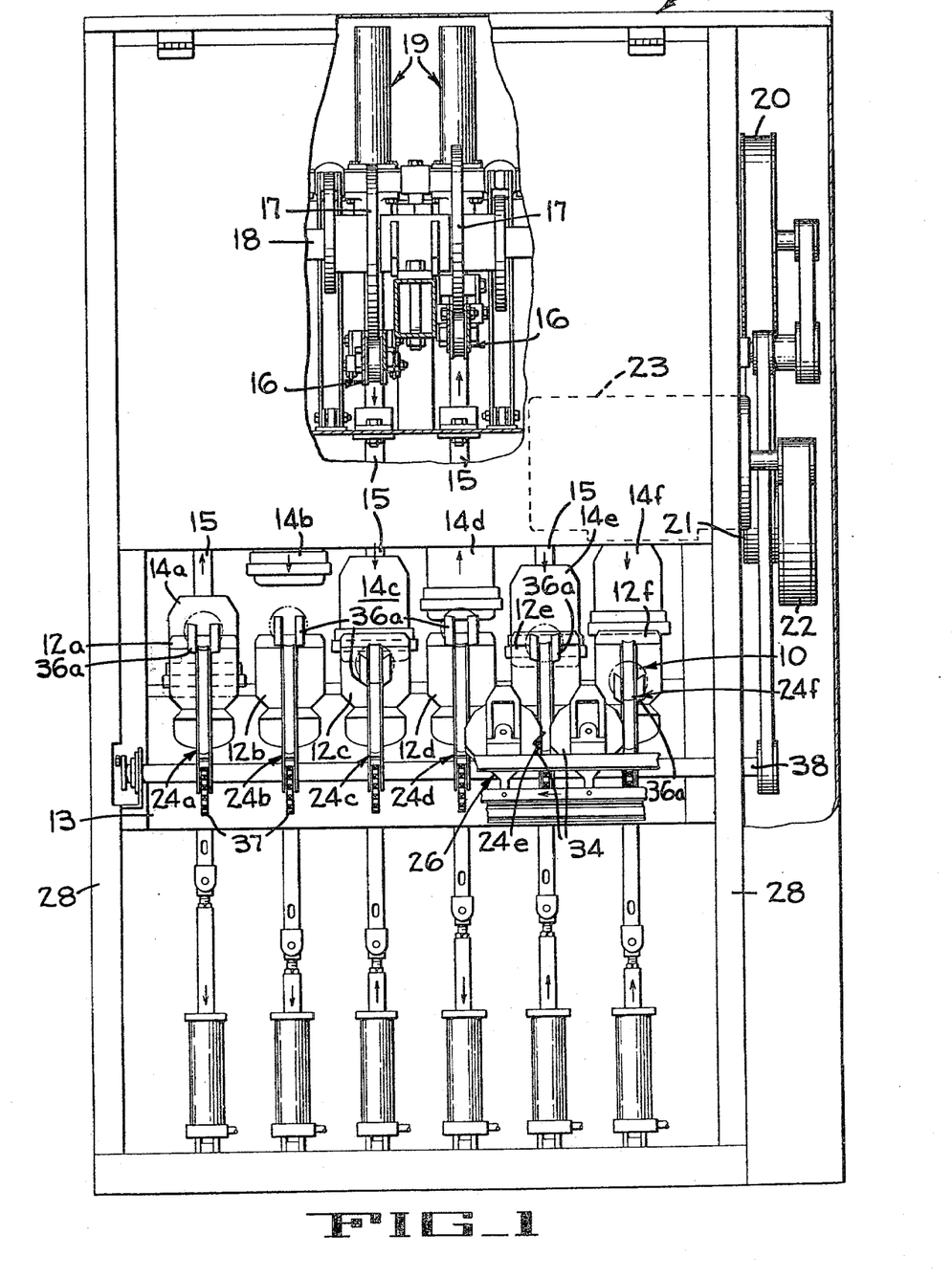
FIG. 1 is a somewhat diagrammatic front elevational view of a sequential citrus fruit juice extractor that incorporates the fruit feeding apparatus of the present invention with parts of the housing of the extractor being broken away to illustrate the drive mechanisms for the upper extractor cups and with parts of the hopper being broken away to better illustrate the fruit feeding apparatus.
Figure 2:
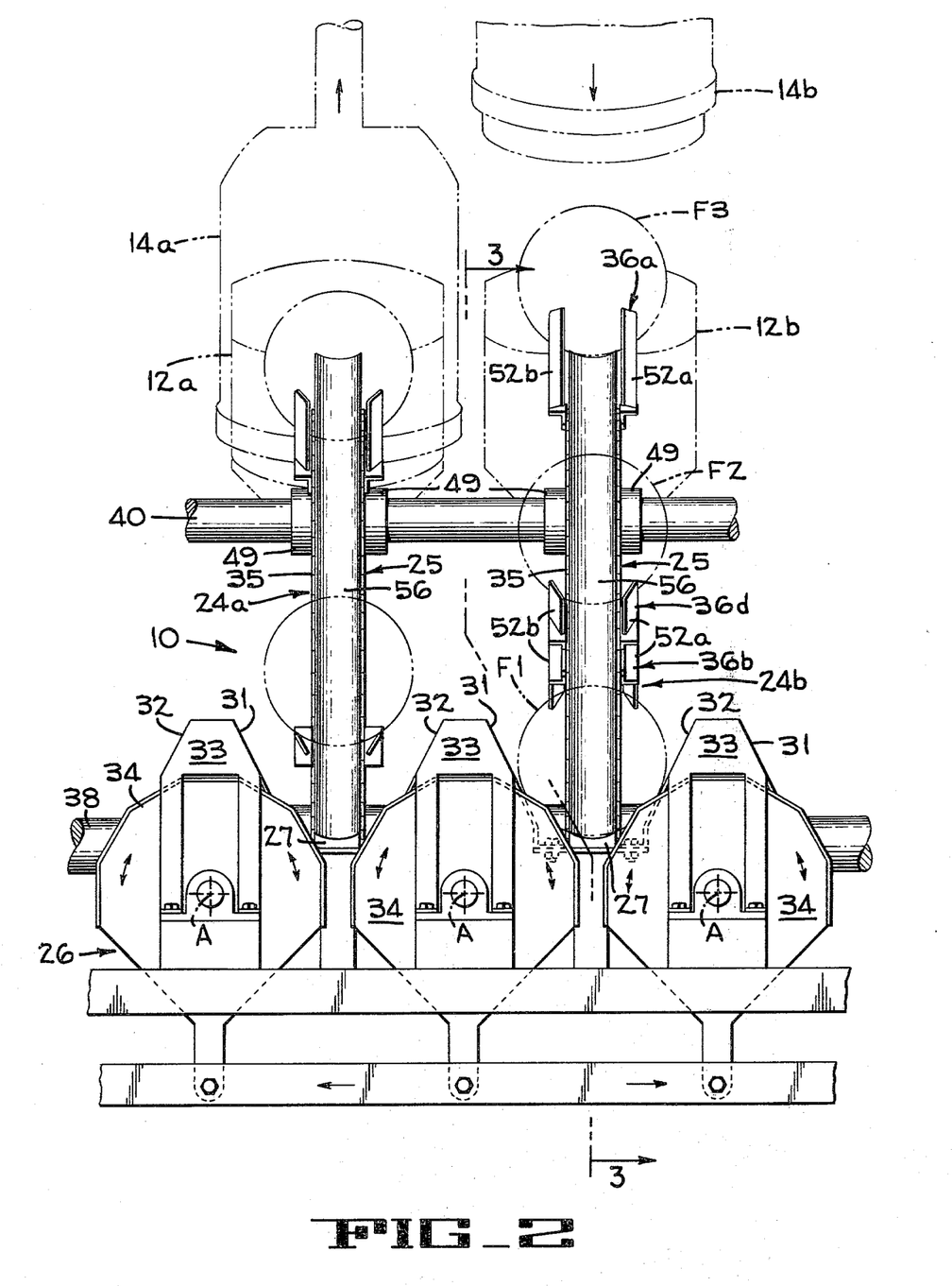
FIG. 2 is an enlarged fragmentary, front elevational view taken at a slight angle from the vertical and showing two adjacent feeder mechanisms of the feeding apparatus.
Figure 3:
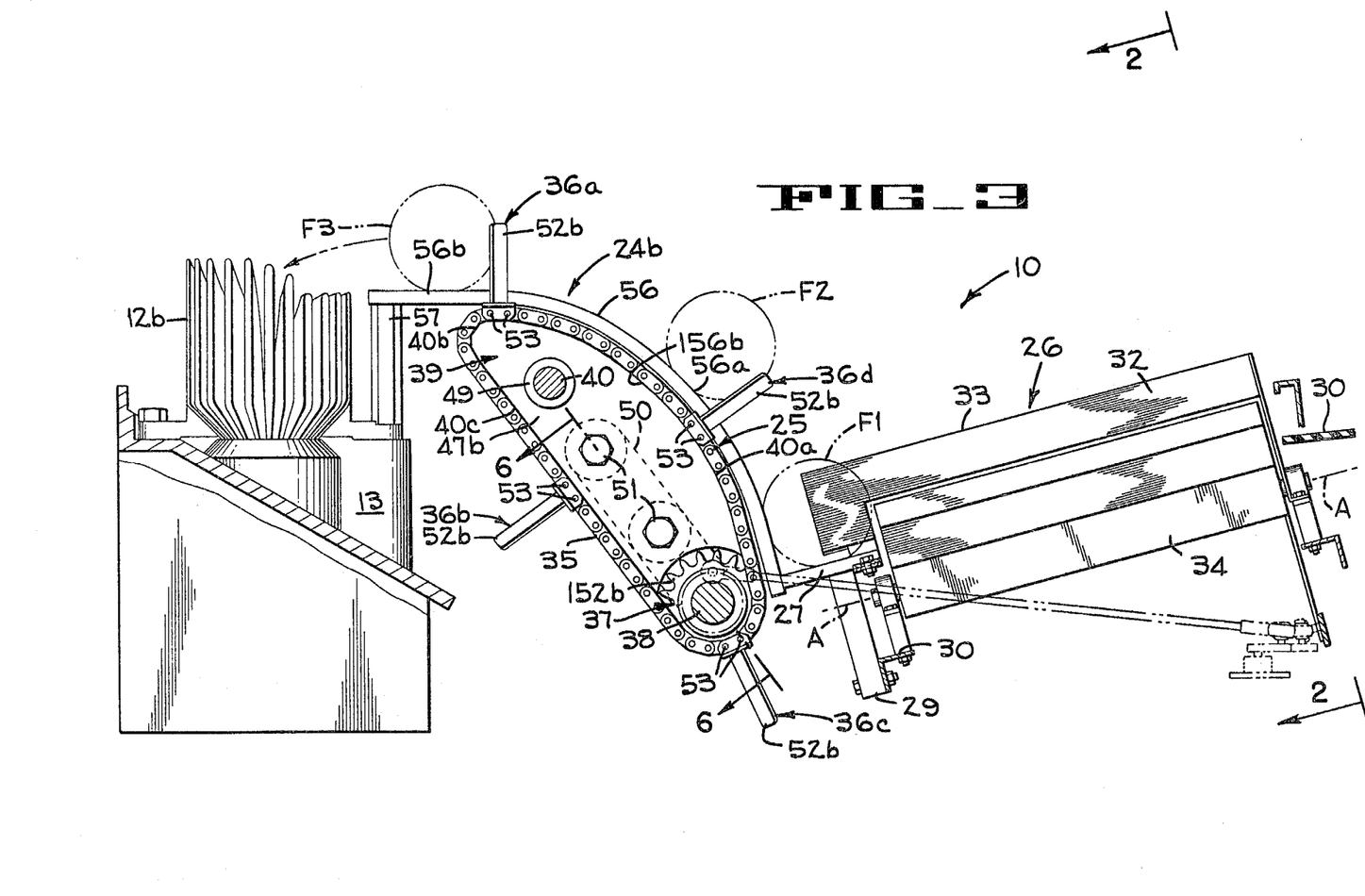
FIG. 3 is a section taken generally along line 3—3 of FIG. 2 with the fruit being depicted in phantom outline.

Referring now more particularly to FIGS. 1-3, a sequential citrus fruit feeding apparatus 10 is shown in conjunction with a sequential citrus fruit juice extractor 11. The sequential juice extractor 11 is fully described in the aforementioned copending patent application, Ser. No. 120,966, filed Feb. 13, 1980, of Gregory J. Larsen et al entitled, Citrus Fruit Juice Extractor and reference may be made to this application for details of the construction of the extractor. In general, the extractor includes several lower fruit receiving cups 12a-12f which are rigidly mounted to a bedplate 13 (FIG. 3). As described in U.S. Pat. No. 2,780,988 to W. C. Belk et al, each extractor cup includes a plurality of circumferentially spaced fingers that form a fruit-receiving cavity. The fingers of the lower cups are higher at the side thereof that are distal from the fruit feeding apparatus to divert fruit downwardly therein (FIG. 3). Upper cups 14a-14f are reciprocatably mounted directly above the lower cups. The upper cups also include similar circumferentially spaced fingers which are adapted to interdigitate with the fingers of the lower cups to compress a citrus fruit positioned between the cups to extract the juice from the fruit and to also expel the peel through an annular opening in the upper cup after the juice has been extracted. As specifically disclosed in the aforementioned copending U.S. patent application to Larsen et al, the upper cups are sequentially driven in a precise timed relationship to each other. The fruit feeding apparatus 10 is operatively connected to the drive mechanism of the extractor, as described in detail hereinafter, to feed citrus fruit successively to each of the lower cups when the associated upper cup is raised above the underlying lower cup, as illustrated with respect to cup 12b in FIG. 3.

Figure 5:
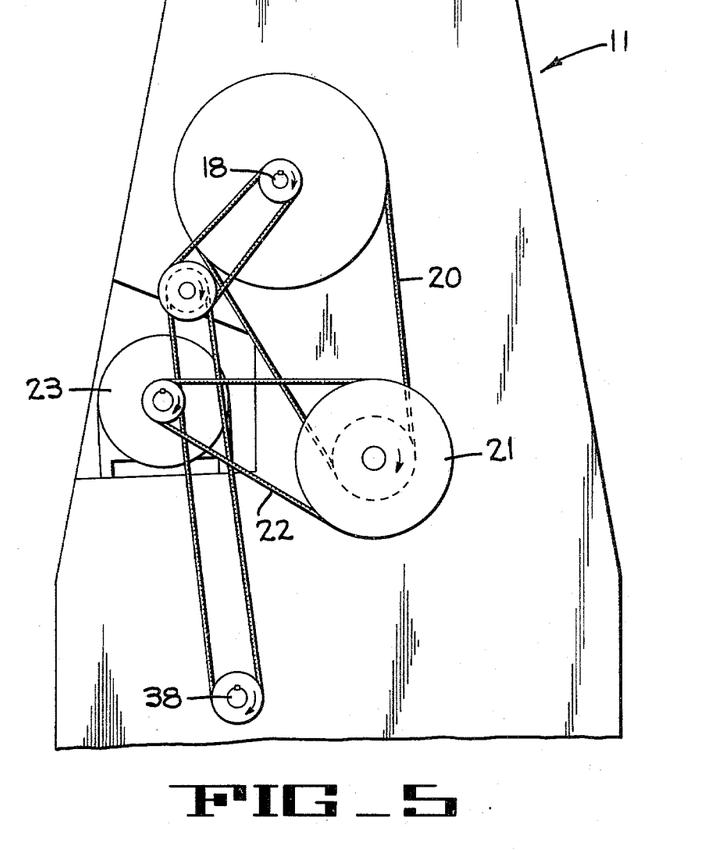
FIG. 5 is a fragmentary side elevational view that illustrates the connection of the feeding apparatus of the present invention to its drive mechanism.

Each upper cup is mounted upon the end of a vertical drive shaft 15 that is driven by a cam follower arm assembly 16 (FIG. 1). Each cam follower arm assembly 16 is driven by a cam 17 mounted on a camshaft 18. Since the extractor includes six pairs of upper and lower cups, there are, of course, six cams 17 on the camshaft. These cams are mounted thereon in multiples of 60° out-of-phase with each other to drive the cups in a preselected sequence so that only one cup fully compresses a fruit at a time. Each cam 17 is adapted to drive the respective cup shaft 15 downwardly against pressure exerted on the upper end of the shaft by an air spring 19. As shown in FIG. 5, the camshaft 18 is connected to a timing belt 20 that is also entrained on an idler 21, and the idler is in turn connected by a belt 22 to a motor 23. It is contemplated that the extractor 11 will be operated at a speed of 150 revolutions per minute and, accordingly, that each pair of upper and lower cups will extract juice from 150 fruit per minute to thus extract juice from a total of 900 fruit per minute. At this very high extraction rate, it is calculated that the opposed cups will remain open for fruit to be fed for only a very short period of time.

Figure 4:
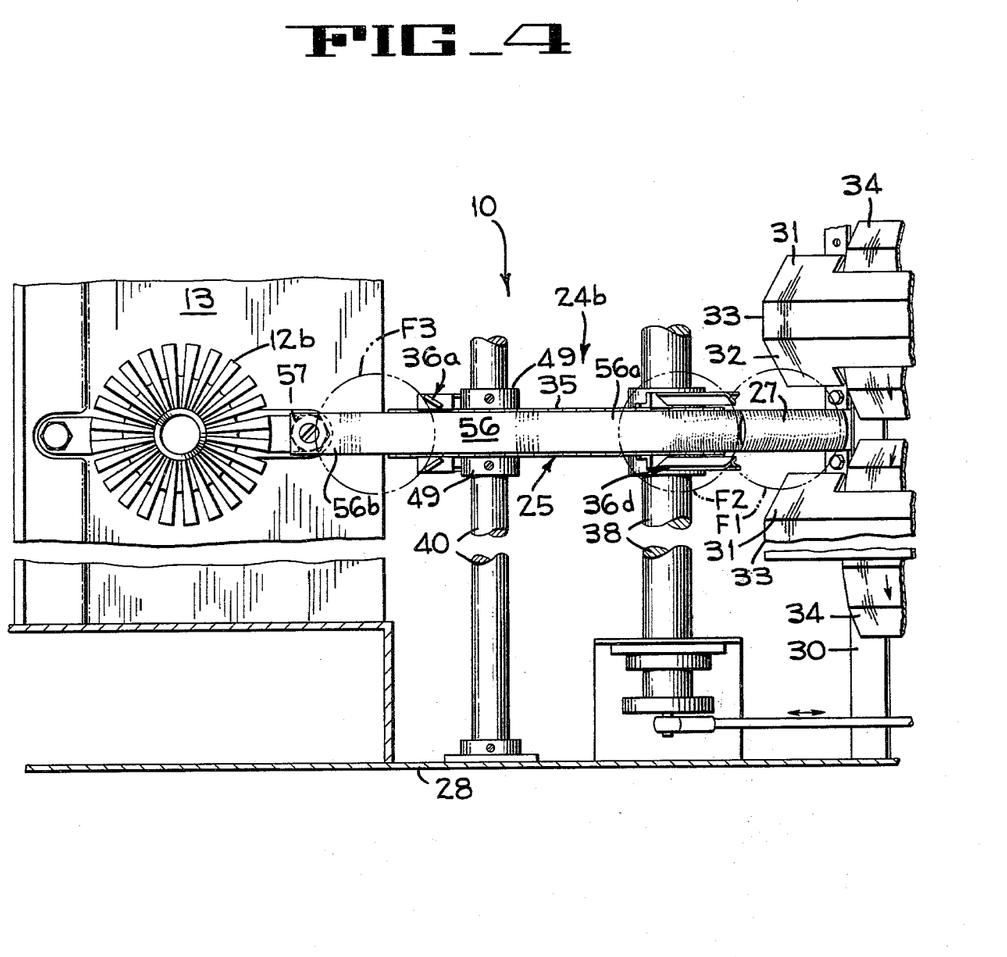
FIG. 4 is a fragmentary top plan view of one of the fruit feeder mechanisms, again with the fruit being depicted in phantom outline.

The fruit feeding apparatus 10 generally includes six fruit feeder mechanisms 24a-24f that are aligned with the six lower cups 12a-12f, respectively (FIG. 1). As shown in FIGS. 2-4 with respect to the feeder mechanism 24b, each feeder mechanism includes a vertically disposed chain conveyor 25 powered by a common feeder drive shaft 38. The feeder mechanisms are fed with fruit by a hopper 26 that, in turn, receives fruit from an inclined conveyor belt 30 (FIG. 3). The hopper 26 feeds the fruit in six transversely spaced files to six pick-up stations adjacent the lower ends of the chain conveyors. The hopper 26 is fully described in a copending, concurrently filed patent application, Ser. No. 120,967, filed Feb. 13, 1980, of Gregory J. Larsen and entitled Feeders for Fruits and the Like; such application is also filed concurrently herewith and the disclosure thereof is incorporated herein by reference. Generally, the hopper 26 includes several longitudinally truncated drums 34 that are mounted in parallel, uniformly transversely spaced relationship (FIG. 2). The drums are oscillated back and forth through limited arcs about their axes A—A of rotation to cause the citrus fruit thereon to oscillate to thereby align themselves in single files between the drums so that only one citrus fruit will be fed at a time to the pick-up stations adjacent the lower ends of the respective chain conveyors 25. Straight, downwardly sloped, concave bridges 27 are mounted at the upper end of posts 29 at the pick-up stations to support fruit for pick-up by the associated conveyors 25. The posts are mounted upon a rail 30 that is connected between side walls 28 (FIG. 1) of the extractor 11. Referring to FIGS. 2 and 4, it may be further noted that divider rails 33 are mounted above each hopper drum, and the sides of a citrus fruit are supported at a pick-up station by upwardly and outwardly sloping surfaces 31 and 32 formed on opposing surfaces of the divider rails.

Each chain conveyor 25 of the feeding apparatus includes an endless chain 35 (FIG. 3) having four finger units 36a-36d rigidly attached thereto to extend outwardly thereof at uniformly spaced intervals along the chain. Each endless chain is entrained upon a drive sprocket unit 37 (FIG. 3) which is affixed to the feeder drive shaft 38. Each chain conveyor further includes a guide plate assembly 39 upon which the endless chain is entrained. The guide plate assembly is suspended on a rod 40 that extends transversely and horizontally parallel to the feeder drive shaft between the side walls 28 of the extractor (FIGS. 3 and 4). As will be described in more detail hereinafter, each guide plate assembly has an upper edge portion 40a that is straight at its lower end as the fruit is picked up at the pick-up station (i.e., bridge 27) and elevated thereabove and then is curved through a relatively large radius (which only gradually decreases) to cause the finger units to tilt gradually forwardly as they travel upwardly to a height that is slightly above the associated lower cup. Each guide plate assembly further includes a sharply curved top edge portion 40b that is contiguous with the edge portion 40a and that has a sharp curvature adapted to cause each finger unit to pivot rapidly forwardly after a fruit has been elevated to the height of the lower cup. The finger units are then returned over a straight edge portion 40c of the guide plate assembly to the sprocket unit 37. Such rapid pivoting of each finger unit as it traverses the sharply curved edge portion 40b causes the fruit to be ejected at a high velocity toward the cup to thereby assure that the fruit will be fed to the lower cup at that precise point in time when the upper cup is sufficiently elevated from the lower cup. Moreover, the relatively gradual forward tilting of each finger unit as it traverses the upper edge portion 40a minimizes the possibility that a fruit will fall from the finger unit as it is elevated to the height of the cup.

Figure 6:
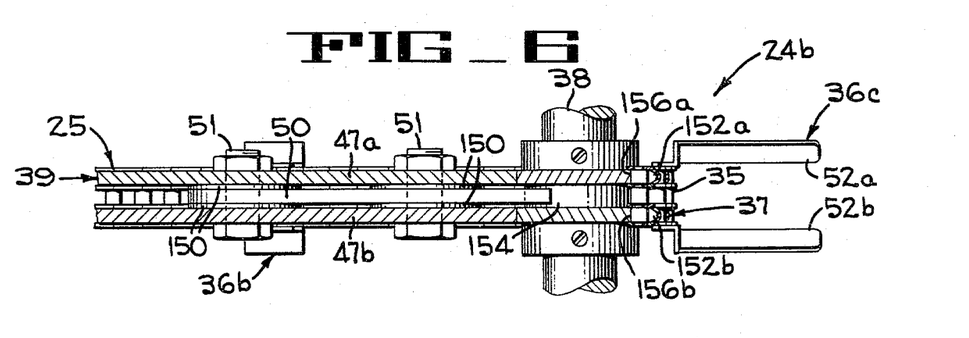
FIG. 6 is an enlarged section taken on line 6—6 of FIG. 3.

Referring next to FIGS. 3 and 6, each guide plate assembly 39 will be seen to include a pair of identical plates 47a and 47b arranged in parallel and formed from a wear-resistant low friction material such as ultrahigh-molecular-weight polyethylene. The plates have apertures near their upper ends through which the support rod 40 extends, and sets collars 49 are fastened to the support rod to retain the guide assembly thereon (FIGS. 2, 3 and 4). A support bar 50 (FIG. 6) is sandwiched between the plates, and bolts 51 are provided to secure the bar between the plates, with spacer washers 150 (FIG. 6) being mounted on the bolts between the bar and the plates. Each sprocket unit 37 is comprised of a pair of sprockets 152a and 152b, and a bearing 154 disposed between the sprockets (also FIG. 6). The lower end of the support bar 50 is cut away on the radius of the bearing 154, and such lower end is propped against the bearing to thereby secure the entire guide plate assembly at the desired rotative position on the support rod 40. It will be noticed in FIG. 3 that the lower ends of the chain guide plates 47a, 47b have a curved configuration having a radius that is slightly larger than that of the sprockets 152a, 152b to provide clearance for the sprockets.

The endless chain 35 is a relatively wide tandem type of chain fabricated from wear-resistant plastic. Such a suitable tandem chain is manufactured by the Morse Chain Division of the Borg-Warner Corporation of Chicago, Ill. and is sold under their Part No. N-500. The chain has two transversely spaced, running surfaces 156a and 156b (FIG. 6) that are received on the sprockets 152a and 152b, respectively, and that ride on the guide plates 47a and 47b, respectively.

Each of the finger units 36a-36d includes right and left fingers 52a and 52b (FIG. 6) that are rigidly secured to a link of the chain 35 by two adjacent connecting pins 35 of the chain (FIG. 3). As shown in FIGS. 3 and 6, the fingers extends perpendicularly from the chain link to which they are attached, and the portions of the fingers that extend outwardly of the chain are flat and are sloped rearwardly and inwardly to form a V-shaped cradle for supporting a fruit. The two fingers of each unit are transversely spaced by distance sufficient to straddle the support bridge 27 (FIG. 4) and each have a width adapted to clear the surfaces 31 and 32 of the divider rails 33 of the hopper 26 through which they pass. The fingers have a length that assures appropriate clearance from the bedplate 13 as the fingers move from the sharply curved edge portion 40b onto the straight edge portion 40c on the underside of the guideplate assembly 39.

Each feeder mechanism 24a-24f further includes an arched bridge 56 (FIGS. 2-4) that extends upwardly from the associated support bridge 27 to a position adjacent the associated lower cup 12a-12f of the extractor. Each bridge 56 includes a curved upstream portion 56a (FIGS. 3 and 4) that has a curvature matching the curvature of the edge portion 40a of the guideplate assembly 39. Such upstream portion of the bridge communicates with a straight end portion 56b that is horizontally disposed at a height slightly above the fingers on the adjacent side of the lower extractor cup. The bottom end of the upstream bridge portion 56a is fastened to the support bridge 27, and the downstream end portion 56b is connected to a column 57 that extends vertically from the bedplate 13 (FIG. 3). The arched bridge 56 has a concave curvature in cross-section to assist in guiding the fruit as it is conveyed by the fingers from the support bridge 27 to the extractor cup. It will be seen in FIG. 3 that the juncture between the curved and straight portions of the arched bridge is directly above the juncture between the broadly curved edge portion 40a and the sharply curved edge portion 40b of the guideplate assembly.

The feeder mechanisms 24a-24f, as previously stated, convey fruits from pick-up stations on the associated support bridges 27 to the lower extractor cups 12a-12f in a sequential manner that is precisely synchronized with the sequential movements of the upper extractor cups 14a-14f, respectively. To provide for such precise synchronization, the chains 35 of the separate feeder mechanisms 24a-24f are initially installed on the respective sprocket units 37 so that the finger units 36a-36d of each chain move in exact synchronism with the associated upper extractor cup. The various different connections of the chains upon the feeder shaft 38 are generally indicated in FIG. 1 wherein it can be seen that the finger units 36a of the six feeder mechanisms are all at different positions: the finger unit 36a of the feeder mechanism 24b is supporting a fruit (in phantom outline) on the straight section 56b of the arched bridge 56 in a position just prior to ejecting the engaged fruit into the lower cup 12b, the upper cup 14b being elevated; at the same point in time, the extractor cup 14a is lowered so as to extract the juice from the orange in the lower cup 12a, and the next fruit to be fed to the lower cup 12a is supported on the finger unit 36a of the feeder mechanism 24a near the upper end of the curved section 56a of the bridge 56 (see also FIG. 3). The corresponding finger units 36a of the other feeder mechanisms 24c-24f are shown in FIG. 1 at various other positions that correspond to the correlative positions of the upper cups 14c-14f, respectively. Generally, the feeder mechanisms feed fruit to the associated lower extractor cups in the following sequence: 24a, 24e, 24c, 24f, 24b and 24d. It is further noted that the finger units 36a-36d are illustrated in the drawings at positions which best illustrate the elements of the fruit feeding apparatus 10, and such positions are not necessarily accurately illustrated relative to the positions of the upper extractor cups 14a–14f.

A brief description of the operation of the feeder mechanisms 24a–24f will now be set forth in conjunction with FIGS. 3 and 4. In these drawings, three fruit F1, F2 and F3 are shown as being engaged against the arched bridge 56 of the feeder mechanism 24b. The fruit F1 is at the pick-up station upon the support bridge 27. It should be noted that other fruit are supported in the associated lane of the hopper 26, but such fruit are not shown in the drawings. The support bridge 27 is mounted at an angle so that it projects within the straight portion of the path of the chain on the upper edge portion 40a of the guide plate assembly. This assures that the fruit will be moved at its slowest speed when it is picked up. Accordingly, with continued movement of the chain 35, the fruit F1 will be engaged by the finger unit 36c with the fingers thereof extending parallel to the support bridge, that is, with the fingers extending at the aforesaid angle of approximately 15° above the horizontal. It is further noted that the finger unit 36c engages the fruit F1 after it has been brought into an orientation that is normal to the arched bridge 56.

As illustrated by finger unit 36d that is carrying the fruit F2, the finger units remain in said normal relationship with the arched bridge 56 as they traverse the broadly curved path between the support bridge 27 and the upstream end of the curved portion 56a of the bridge. That is to say, during the upwardly inclined portion of the path of travel of the fruit, the finger units do not pivot forwardly relative to the arched bridge to impart velocity to the fruit that is additive to the velocity imparted by the forward movement of the chain. It will therefore be appreciated that as the fruit is carried through the curved path, the centrifugal force that would tend to cause the fruit to roll outwardly on the fingers will be a function of the radius of curvature of the bridge, the velocity of the chain and also the diameter of the fruit being handled. To minimize the possibility of fruit falling from the feeder mechanisms, the curvature of the edge portion 40a of the guideplate assembly 39 (and the matching curvature of the curved portion 56a of the bridge) is selected to assure that at a preselected chain speed the centrifugal force acting on the fruit will be less than the counteracting weight component of the fruit that urges the fruit downwardly against the bridge, thus assuring positive control of the fruit as it is elevated to the discharge height above the lower extractor cup.

In FIGS. 3 and 4, the finger unit 36a will be seen to be directly above the juncture between the sharply curved edge portion 40b and the broadly curved edge portion 40a of the guideplate assembly 39 and thus also at the juncture between the curved portion 56a and the straight portion 56b of the arched bridge 56. As the chain 35 pulls the finger unit 36a around the edge portion 40b, the fingers thereof will pivot rapidly forward to propel the fruit across the horizontal bridge portion 56b and into the cup. Accordingly, it will be seen that the fruit is rapidly accelerated only after it has been fully elevated and is supported on the straight portion of the bridge. The major portion of the acceleration of the fruit is thereby obtained by the mechanical advantage gained by the forward pivoting of the fingers as they traverse about the sharply curved edge of the guideplate assembly.

As previously stated, the fingers on the sides of the lower extractor cups 12a–12f that are distal from the bridges 56 are higher than the fingers on opposite sides of the cups that are adjacent the feeder mechanisms. As can be seen in FIG. 3, the horizontal end portions 56b of the bridges 56 are slightly higher than the adjacent fingers of the lower cups but are lower than the fingers on the distal side of the cup. Thus, with continued travel of the chain 35, the fruit F3 will be propelled by the finger unit 36a horizontally across the bridge 56 and into relatively horizontal trajectory (shown by an arrow in FIG. 3) to impact against the fingers on such distal side of the lower cup 12b to thereby be deflected downwardly into the cup.

Although the best mode contemplated for carrying out the present invention has been herein shown and described, it will be apparent that modification and variation may be made without departing from what is regarded to be the subject matter of the invention.

What is claimed is:

1. An apparatus for successively feeding rounded objects such as fruit from a plurality of pick-up stations to a plurality of reception areas comprising: a plurality of endless chains; a plurality of means for respectively guiding said chains through preselected curvilinear paths that lie in transversely spaced vertical planes; a finger rigidly attached to each chain to extend outwardly thereof in said curvilinear path; a plurality of means for supporting fruit to be fed at pick-up stations that are aligned with said paths; means for concurrently driving said chains upwardly over the respective guiding means; each curvilinear path extending from adjacent said fruit supporting means upwardly to a height above the reception areas to which the fruit are to be fed and thereafter extending downwardly through a sharp curvature to cause said finger to pivot rapidly forwardly to accelerate the fruit toward its reception area.

2. The apparatus according to claim 1 further comprising a plurality of bridges for slidably guiding the fruit as it is propelled by said finger, each bridge extending from one of said support means upwardly and parallel to said curvilinear path.

3. The apparatus according to claim 2 wherein each bridge includes an end portion extending horizontally over the sharp curvature portion of the curvilinear path to support a fruit as it is accelerated by said rapid forward pivoting of said finger.

4. An apparatus for successively feeding fruit to a fruit juice extractor, said juice extractor including a lower extractor cup, an upper extractor cup which is reciprocatably mounted above said lower cup, and means for operating said upper cup to reciprocate said upper cup to extract juice from a fruit received in the lower cup, said feeding apparatus comprising: a drive shaft operatively connected to said means for driving said upper cup; an endless chain operatively connected to said drive shaft to move in synchronized relationship to the movement of the upper cup of said extractor; said endless chain having a finger extending outwardly thereof; chain guide means for guiding said chain through a loop that is aligned with the cups of the extractor; a fruit support associated with said chain for supporting fruit to be fed to said extractor; said chain guide means being mounted so that the finger engages a fruit on the fruit support, lifts the fruit therefrom, elevates the fruit toward the adjacent lower cup of the extractor and propels the fruit into the adjacent lower cup while the opposed upper cup is elevated, and said chain guide means having a shape to cause the finger to first move through a broadly curved path until the fruit is at a height at which it may be propelled into the associated lower extractor cup and to thereafter cause the finger to pivot rapidly forward to accelerate the fruit.

5. The feeding apparatus of claim 4 further including a bridge extending tangentially from the upper end of the endless chains to guide the fruit toward the lower cup as it is ejected from the chain.

6. The feeding apparatus according to claim 4 further including a bridge for guiding the fruits, said bridge extending above said chain from said support to the vicinity of the lower cup.

7. A sequential feeder for use in feeding citrus fruit to a sequential citrus fruit juice extractor, said extractor including several lower extractor cups, several upper extractor cups, means for reciprocatably mounting said upper cups relative to said lower cups, and means for driving said upper cups in a sequential relationship, said sequential feeder comprising: a drive shaft operatively connected to said means for driving said upper extractor cups, several endless chains operatively connected to said drive shaft, each chain having a finger rigidly attached thereto, several chain guide plates for causing the said chains to move through loops extending through transversely spaced vertical planes that are aligned with the lower extractor cups, means for supporting fruit to be fed to said cups at transversely spaced positions aligned with said chains, each of said chain guide plates having a contour adapted to said chains to cause the associated finger to move upwardly to engage a fruit supported on said fruit support means, to elevate the fruit to a height above the lower extractor cup, and thereafter propel the fruit toward the lower cup, said chains being connected to said shaft so that the fingers thereof move in timed relation to the movement of the associated upper extractor cup, and a bridge adjacent the upper end of each of said chains for guiding the fruit as it is accelerated toward said upper extractor cups.

8. The sequential feeder according to claim 7 wherein each of said chain guide plates is contoured to cause the chain to move upwardly from said fruit support means first through a relatively large curved path until a fruit is at said height above the lower extractor cup and to thereafter move downwardly through a relatively small curved path to cause the finger to pivot rapidly forward and propel the fruit rapidly toward the associated lower cup.

9. The improved apparatus according to claim 7 or claim 8 wherein each of said bridges is mounted over said chains for slidably guiding a fruit as it is elevated from said support means to said height above the lower extractor cup and for thereafter guiding the fruit as it is propelled toward the lower cup.

10. A fruit feeder comprising an endless chain, a plurality of uniformly spaced fingers mounted on said chain to project outwardly therefrom, guide plates for mounting said chain for continuous movement, means for continuously driving said chain about the periphery of said guide plates, said guide plates having a contour providing a broadly curved portion extending from the lower end of the guide plates to the upper end thereof and terminating in a sharply curved portion at the upper end of the guide plates and plates for mounting said guide means so that the upper end projects forwardly from the lower end in the direction of movement of the upper run of the chain whereby fruit which is picked up by said fingers at a pick-up station adjacent the lower end of the guide plates will be elevated at the linear speed of the chain and then accelerated and ejected from the feeder as the chain moves through said sharply curved portion of the guide plates at the upper end thereof.

11. A fruit feeder according to claim 10 wherein each of said fingers comprises a pair of laterally spaced members mounted on opposed sides of said chain and projecting outwardly therefrom, said members being received on the opposite sides of said guide plates.

* * * * *